United States Patent
Xue et al.

(10) Patent No.: US 11,321,354 B2
(45) Date of Patent: May 3, 2022

(54) SYSTEM, COMPUTING NODE AND METHOD FOR PROCESSING WRITE REQUESTS

(71) Applicant: HUAWEI TECHNOLOGIES CO., LTD., Guangdong (CN)

(72) Inventors: Xun Xue, Markham (CA); Huaxin Zhang, Markham (CA); Yuk Kuen Chan, Markham (CA); Wenbin Ma, Sammamish, WA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 223 days.

(21) Appl. No.: 16/590,078

(22) Filed: Oct. 1, 2019

(65) Prior Publication Data

US 2021/0097035 A1    Apr. 1, 2021

(51) Int. Cl.
| | |
|---|---|
| *G06F 16/27* | (2019.01) |
| *G06F 16/23* | (2019.01) |
| *G06F 11/14* | (2006.01) |
| *G06F 16/174* | (2019.01) |

(52) U.S. Cl.
CPC ........ *G06F 16/273* (2019.01); *G06F 11/1451* (2013.01); *G06F 16/174* (2019.01); *G06F 16/2358* (2019.01)

(58) Field of Classification Search
CPC .... G06F 16/27; G06F 16/273; G06F 11/1451; G06F 11/1402; G06F 11/1471; G06F 16/235; G06F 16/2358
USPC ........................................................ 707/634
See application file for complete search history.

(56) References Cited

U.S. PATENT DOCUMENTS

| | | | | |
|---|---|---|---|---|
| 5,561,778 | A  * | 10/1996 | Fecteau ............... | G06F 12/0292 711/209 |
| 5,819,020 | A  * | 10/1998 | Beeler, Jr. ........... | G06F 11/2071 714/5.11 |
| 6,480,950 | B1 * | 11/2002 | Lyubashevskiy ... | G06F 12/1027 711/202 |
| 7,552,147 | B2 * | 6/2009 | Josten ................. | G06F 16/2365 |
| 9,223,843 | B1 * | 12/2015 | Madhavarapu ....... | G06F 16/273 |
| 9,747,295 | B1 * | 8/2017 | Antao .................. | G06F 16/162 |
| 10,360,195 | B1 * | 7/2019 | McKelvie ........... | G06F 16/2282 |
| 2002/0087801 | A1 * | 7/2002 | Bogin ................ | G06F 12/0835 711/137 |

(Continued)

FOREIGN PATENT DOCUMENTS

| | | |
|---|---|---|
| CN | 106708968 A | 5/2017 |
| CN | 107145432 A | 9/2017 |

(Continued)

OTHER PUBLICATIONS

International Search Report and Written Opinion of PCT/CN2020/114725; Xinlei Zhao, dated Oct. 30, 2020.

*Primary Examiner* — Phuong Thao Cao
(74) *Attorney, Agent, or Firm* — BCF LLP

(57) ABSTRACT

The disclosed computing node comprises a processor and a non-transitory storage medium storing instructions executable by the processor. A method and a system are also disclosed. A subset of a plurality of conventional redo records, corresponding to received write requests, is selected based on an identical data location identifier. The conventional redo records of such selected subset are combined into a consolidated redo record. The consolidated redo record is then transmitted to a target node for processing.

25 Claims, 7 Drawing Sheets

(56) References Cited

U.S. PATENT DOCUMENTS

| | | | |
|---|---|---|---|
| 2008/0120349 A1* | 5/2008 | Kim | G06F 16/2358 |
| 2011/0251997 A1* | 10/2011 | Wang | G06F 11/2097 |
| | | | 707/634 |
| 2011/0295804 A1* | 12/2011 | Erofeev | G06F 11/1435 |
| | | | 707/634 |
| 2012/0166390 A1* | 6/2012 | Merriman | G06F 16/2365 |
| | | | 707/613 |
| 2013/0246358 A1 | 9/2013 | Akulavenkatavara et al. | |
| 2013/0290249 A1* | 10/2013 | Merriman | G06F 16/278 |
| | | | 707/610 |
| 2014/0089599 A1* | 3/2014 | Okawara | G06F 9/30181 |
| | | | 711/140 |
| 2014/0101103 A1* | 4/2014 | Chan | G06F 16/27 |
| | | | 707/634 |
| 2014/0279920 A1* | 9/2014 | Madhavarapu | G06F 16/2358 |
| | | | 707/649 |
| 2014/0281131 A1* | 9/2014 | Joshi | G06F 12/0868 |
| | | | 711/103 |
| 2015/0012713 A1* | 1/2015 | Flanders | G06F 12/0831 |
| | | | 711/146 |
| 2015/0120659 A1* | 4/2015 | Srivastava | G06F 11/2038 |
| | | | 707/625 |
| 2015/0378830 A1* | 12/2015 | Hoobler, III | G06F 11/1446 |
| | | | 707/648 |
| 2016/0283331 A1* | 9/2016 | Barber | G06F 16/2343 |
| 2016/0314161 A1* | 10/2016 | Wen | G06F 16/2329 |
| 2017/0293536 A1* | 10/2017 | Won | G06F 11/1471 |

FOREIGN PATENT DOCUMENTS

| | | | |
|---|---|---|---|
| JP | 56054558 A | * | 5/1981 |
| KR | 100725415 B1 | * | 6/2007 |
| WO | 2016064575 A1 | | 4/2016 |

* cited by examiner

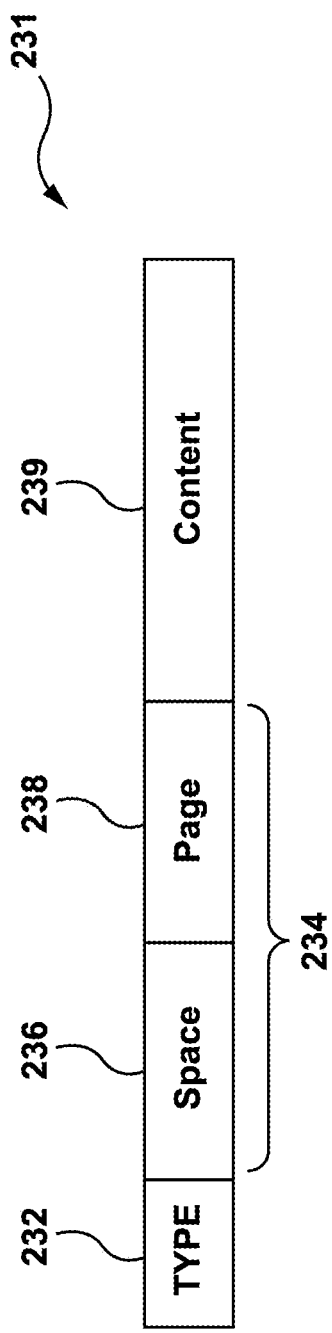
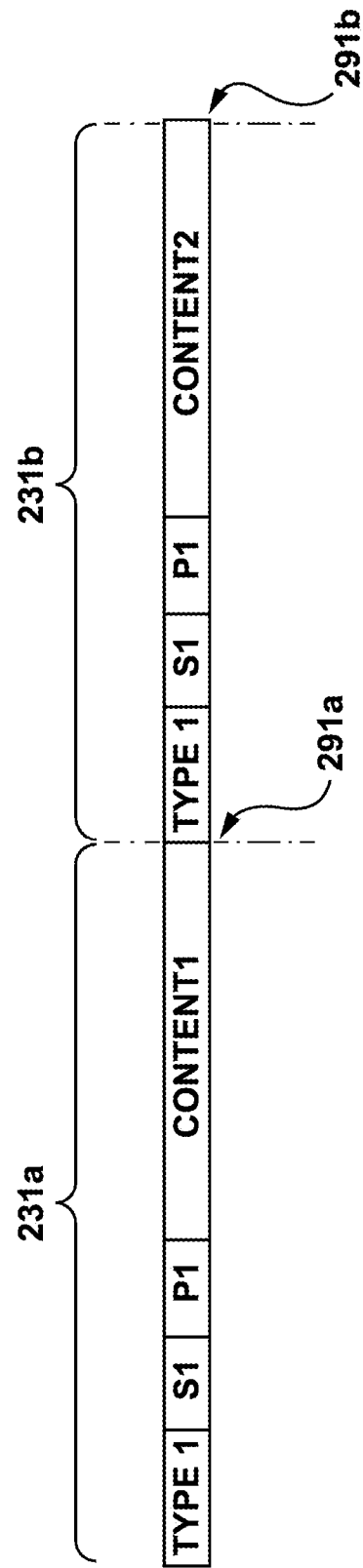
FIG. 2A
FIG. 2B

SYSTEM, COMPUTING NODE AND METHOD FOR PROCESSING WRITE REQUESTS

CROSS-REFERENCE TO RELATED APPLICATIONS

This is the first application filed for the instantly disclosed technology.

FIELD OF THE INVENTION

The present invention generally relates to the field of databases and, in particular, to a system, a computing node and a method for processing write requests.

BACKGROUND

In distributed on-line transaction processing (OLTP), multiple transactions generate requests to insert, update or delete data stored in a database. A redo log comprises redo records that store all changes made to a database and, therefore, serves as a true copy of the data of the database when the database gets corrupted. The redo log is, therefore, a crucial structure for recovery operations. In order to constantly maintain consistency between the data in the database and data in replica databases (i.e., copies of the database), the redo logs need to be processed and transmitted between the computing nodes and master nodes as rapidly as possible.

SUMMARY

An object of the present disclosure is to provide a technique for processing write requests.

In accordance with this objective, an aspect of the present disclosure provides a computing node comprising: a processor and a non-transitory storage medium storing instructions executable by the processor to: receive a plurality of write requests to modify one or more pages of a database; generate a plurality of redo records including one redo record for each write request of the plurality of write requests; select a subset of the plurality redo records, each redo record of the subset comprising an identical data location identifier; combine the redo records of the subset into a consolidated redo record; and transmit the consolidated redo record to a target node.

The data location identifier may comprise a page identifier. The data location identifier may further comprise a space identifier to identify a space, and the page identifier may identify a page within the space.

Each respective redo record of the plurality of redo records may comprise: a respective data location identifier, and a content comprising write data, and the consolidated redo record may comprise: a single instance of the identical data location identifier, and information of the redo records of the subset, the information including contents of the redo records of the subset and excluding individual data location identifiers of the redo records of the subset.

The consolidated redo record may further comprise an overall length value indicating a combined length of the information of the redo records of the subset combined into the consolidated redo record.

Each respective redo record of the plurality of redo records may comprise a type indicator to indicate a type of the respective redo record, and the information of the redo records of the subset included in the consolidated redo record may comprise the type indicators of the redo records of the subset.

Each respective redo record of the plurality of redo records may comprise an individual length value indicating a length of the content of the respective redo record, and the information of the redo records of the subset included in the consolidated redo record may comprise individual length values of the redo records of the subset.

Each respective redo record of the plurality of redo records may comprise a type indicator indicating a type of the respective redo record, a respective individual data location identifier, an individual length value, and a content comprising write data, and the consolidated redo record may contain a single instance of the identical data location identifier, an overall length value indicating a combined length of the information of the redo records of the subset combined into the consolidated redo record, and a plurality of segments, each segment of the plurality of segments comprising (i) the type indicator, (ii) the individual length value, and (iii) the content of a corresponding redo record of the subset, each segment of the plurality of segments excluding the individual data location identifier of the corresponding redo record.

The instructions may be executable on the processor to combine a first value of a first redo record of the subset and a second value of a second redo record of the subset into a merged value included in a segment of the consolidated redo record, the first value representing a first write operation on a first offset in a page, the second value representing a second write operation on a second offset in the page, and the merged value representing a combination of the first write operation and of the second write operation.

The instructions may be executable on the processor to receive an additional write request to modify one or more pages of the database; generate an additional redo record for the additional write request; and if the additional redo record comprises the identical data location identifier and if a number of redo records already combined into the consolidated redo record is less than a specified threshold number of redo records combinable into the consolidated redo record, combine the additional redo record into the consolidated redo record.

The computing node may be a master computing node to process write requests, and the target node may be a replica computing node at which the database is replicated.

In accordance with additional aspects of the present disclosure, there is provided a method for processing write requests. The method comprises: receiving, at a computing node, a plurality of write requests to modify one or more pages of a database; generating, at the computing node, a plurality of redo records including one redo record for each write request of the plurality of write requests; selecting a subset of the plurality of redo records, each redo record of the subset comprising an identical data location identifier; combining, at the computing node, the redo records of the subset into a consolidated redo record; and transmitting the consolidated redo record from the computing node to a target node.

The data location identifier may comprise a page identifier. The data location identifier may further comprise a space identifier to identify a space, and the page identifier may identify a page within the space.

Each respective redo record of the plurality of redo records may comprise a respective data location identifier and a content comprising write data; and the consolidated redo record may comprise: a single instance of the identical data location identifier, and information of the redo records of the subset, the information including contents of the redo records of the subset and excluding individual data location identifiers of the redo records of the subset.

The consolidated redo record may further include an overall length value indicating a combined length of the information of the redo records of the subset combined into the consolidated redo record.

Each respective redo record of the plurality of redo records may comprise a type indicator to indicate a type of the respective redo record, and the information of the redo records of the subset included in the consolidated redo record may comprise type indicators of the redo records of the subset.

Each respective redo record of the plurality of redo records may comprise an individual length value indicating a length of the content of the respective redo record, and the information of the redo records of the subset included in the consolidated redo record may comprise individual length values of the redo records of the subset.

Each respective redo record of the plurality of redo records may comprise a type indicator indicating a type of the respective redo record, a respective individual data location identifier, an individual length value, and a content comprising write data, and the consolidated redo record may contain a single instance of the identical data location identifier, an overall length value indicating a combined length of the information of the redo records of the subset combined into the consolidated redo record, and a plurality of segments, each segment of the plurality of segments comprising (i) the type indicator, (ii) the individual length value, and (iii) the content of a corresponding redo record of the subset, each segment of the plurality of segments excluding the individual data location identifier of the corresponding redo record.

The instructions may be executable on the processor to: combine a first value of a first redo record of the subset and a second value of a second redo record of the subset into a merged value included in a segment of the consolidated redo record, the first value representing a first write operation on a first offset in a page, the second value representing a second write operation on a second offset in the page, and the merged value representing a combination of the first write operation and of the second write operation.

The method may further comprise: receiving an additional write request to modify one or more pages of the database; generating an additional redo record for the additional write request; and if the additional redo record comprises the identical data location identifier and if a number of redo records already combined into the consolidated redo record is less than a specified threshold number of redo records combinable into the consolidated redo record, combining the additional redo record into the consolidated redo record.

The computing node may be a master computing node to process write requests, and the target node may be a replica node at which the database is replicated. Wherein combining, at the computing node, the redo records of the subset into the consolidated redo record, may further comprise: receiving a first redo record having a first data location identifier; generating a first consolidated redo record comprising: the first data location identifier and a first segment based on the first redo record; receiving a second redo record having a second data location identifier; if the first data location identifier is the identical as the second data location identifier: generating a second consolidated redo record by adding, to the first consolidated redo record, a second segment based on the first redo record and excluding the second data location identifier.

The method may further comprise: if the first data location identifier is different from the second data location identifier: generating a new consolidated redo record comprising: the second data location identifier and a new segment based on the third redo record, the new consolidated redo record excluding information of the first redo record.

In accordance with other aspects of the present disclosure, there is provided a system for processing a plurality of write requests. The system comprises: a database; a computing node adapted to: receive the plurality of write requests to modify one or more pages of the database, generate a plurality of redo records including one redo record for each write request of the plurality of write requests, select a subset of the plurality redo records, each redo record of the subset comprising an identical data location identifier, combine the redo records of the subset into a consolidated redo record, and transmit the consolidated redo record; and a target node adapted to receive the consolidated redo record from the computing node.

Implementations of the present disclosure each have at least one of the above-mentioned object and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE FIGURES

Further features and advantages of the present disclosure will become apparent from the following detailed description, taken in combination with the appended drawings, in which:

FIG. 2A depicts an illustrative example of a schematic view of a conventional redo record generated for one transaction;

FIG. 2B schematically illustrates a fragment of the conventional redo log;

Figure 1:
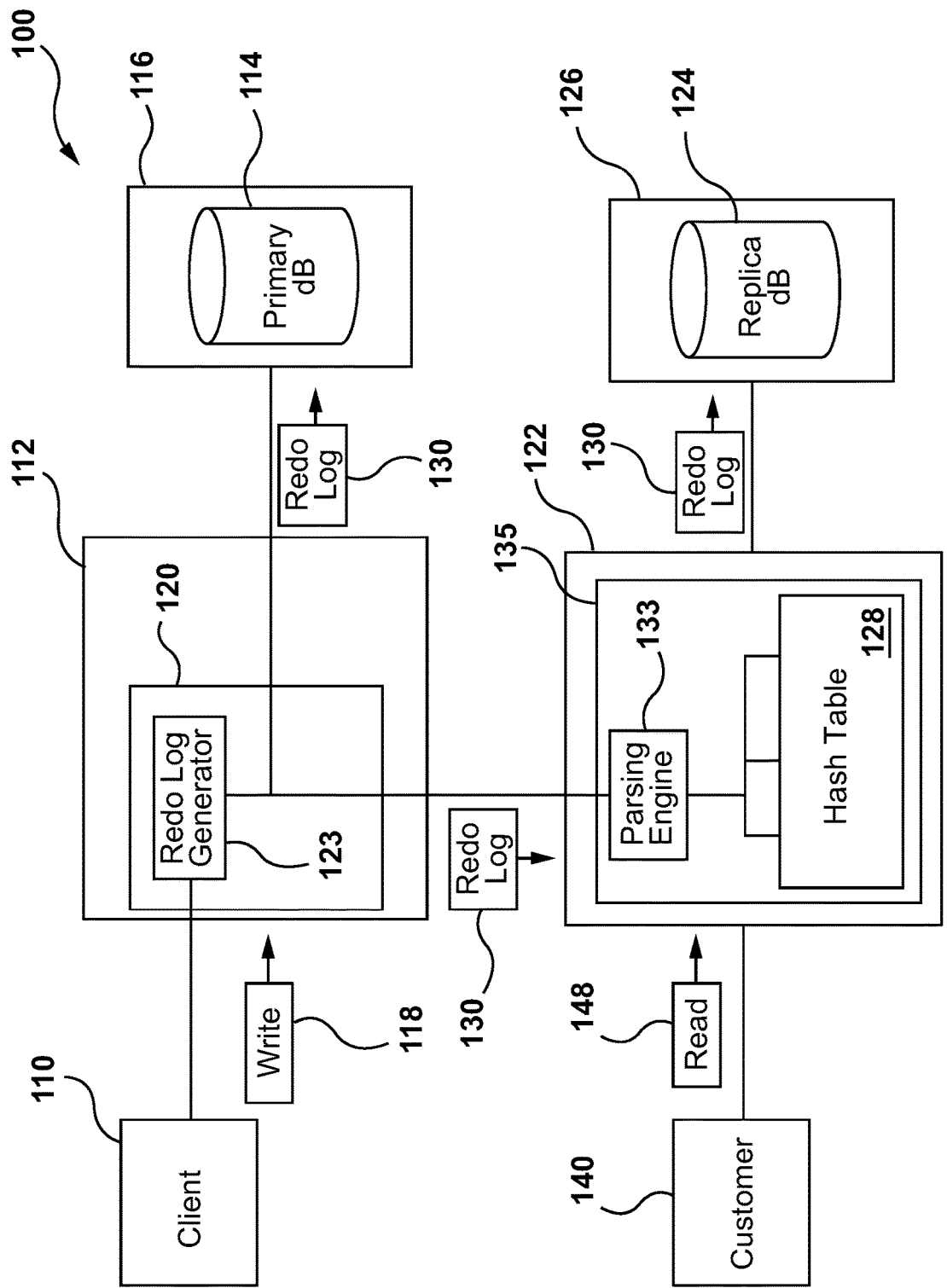
FIG. 1 depicts a schematic diagram of a distributed database conventional system and illustrates conventional processing of redo logs therein.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

Aspects of the present disclosure is directed to address at least some of the deficiencies of the current techniques for processing writing requests. In particular, the present disclosure describes a system, a computing node and a method for accelerated processing of redo logs.

FIG. 1 depicts a schematic diagram of a distributed database conventional system 100 and illustrates conventional processing of redo logs therein. The conventional system 100 comprises a client 110, a master computing node 112, a replica computing node 122, and a customer 140.

The master computing node 112 contains or is connected to a primary database 114. The primary database 114 may be located, for example, on a primary storage node 116. The primary storage node includes multiple storage devices for storing the data of the database. The storage device may be located at a single datacentre or in multiple datacenters at different geographic locations. The master computing node communicates with the primary storage node.

The master computing node 112 may receive structured query language (SQL) statements, such as write requests 118 and/or read requests 148. Originators of SQL statements may be clients, such as client 110, and/or customers, such as customer 140. When referred to herein, client 110 sends out write requests 118, while customer 140 sends out read requests 148. A single device may operate both as client 110 and customer 140.

The "write request", as referred to herein, comprises requests to modify, insert, or delete a specific row on a specific page in a relational table of primary database 114. The write requests 118 may be, for example, requests to add new data to records of pages in primary database 114. In a non-limiting example, one write request 118 may correspond to one OLTP transaction. Examples of OLTP transactions include online banking, booking an airline ticket, purchasing a book online, order entry, and the like.

The master computing node 112 processes SQL statements, including write requests 118 and read requests 148. The replica computing node 122 processes read requests 148.

The master computing node 112 has a master database management system (DBMS) 120 which communicates with clients, such as client 110, various external applications (not depicted), and primary database 114.

The master DBMS 120 is configured to generate conventional redo logs 130 that manifest modifications to be done to primary database 118. The conventional redo logs 130 may be generated by a conventional redo log generator 123. The conventional redo logs 130 may have thousands of conventional redo records described below.

FIG. 2A depicts an illustrative example of a schematic view of a conventional redo record 231 (also referred to herein as a "redo record" 231) generated for one transaction. The conventional redo record 231 comprises a type indicator 232, a data location identifier 234, which may include a space identifier 236 and a page identifier 238. The conventional redo record 231 also comprises a content 239, which has a length value identifier embedded therein (not depicted separately).

Typically, type indicator 232 is one-byte long. The space identifier 236 and page identifier 238 consume one to four bytes each. The format of content 239 depends on the type of conventional redo record 231 that is indicated by type indicator 232. For each write request 118, a separate conventional redo record 231 is generated.

Referring again to FIG. 1, conventional system 100 also comprises replica computing node 122 connected to a replica database 124. Conventional system 100 may comprise more than one replica computing node 122. Each replica computing node 122 is connected to corresponding replica database 124. The replica database 124 may be located, for example, on a replica storage node 126. The replica computing node 122 may be configured to handle read requests 148 received from customer 140.

The master computing node 112 continuously generates and propagates conventional redo logs 130 to one or more replica computing nodes 122. The replica computing node 122 continuously synchronizes with master computing node 112 by applying the conventional redo logs 130 on the data stored in the replica database 124. For this, a hash table 128 is modified in replica computing node 122 and is used as expressed herein below.

A write operation at master computing node 112 is based on a write request 118 received by master computing node 112. The write operation may be considered to be concluded after all or at least a majority of replica computing nodes 122 of conventional system 100 have received conventional redo logs 130 that correspond to that write operation.

In response to read request 148, replica computing node 122 may perform read operation after replica computing node 122 has received all redo logs 130 from master computing node 112 and has finished processing them. The redo logs 130 may need to be quickly transmitted from master computing node 112 to one or more replica computing nodes 122 in order to speed up the completion of write operations.

The redo logs 130 also may need to be processed rapidly by replica computing node 122 to catch up with the write operations and to ensure freshness of data for the read requests. The replica computing nodes 122 parse and add redo logs 130 to their data pages in replica databases 124. After the redo logs 130 are added to replica databases 124, the write operation may be considered to be completed on master computing node 112.

A parsing engine 133 in a replica DBMS 135 performs parsing of conventional redo logs 130 to obtain conventional redo records 231. The conventional redo records 231 are then grouped based on their data location identifiers. Each group of conventional redo records 231 has conventional redo records 231 with same space identifier 236 and page identifier 238. The page identifier 238 identifies the page within the corresponding space of the database. Such groups of conventional redo records 231 are then inserted into hash table 128.

FIG. 2B schematically illustrates a fragment 280 of a conventional redo log 130. The fragment 280 has a first redo record 231a and a second redo record 231b that are sequentially arranged. The second redo record 231b follows the first redo record 231a in fragment 280. Fragments of conventional redo log 130 may have more than two redo records 231a, 231b.

The fragments 280 are transmitted from master computing node 112 to replica computing nodes 122 within dispatch threads (not shown). The dispatch threads form the conventional redo log 130. Each dispatch thread has fragments 280 that are also sequentially arranged. When processing dispatch threads and their fragments 280, both master computing node 112 and replica computing node 122 parse the fragment 280 in order to determine an offset to starting point 291a or 291b of a next redo record in fragment 280.

In order to accelerate completion of the write operation, data may be transmitted rapidly between master computing node 112 and replica computing node 122. Moreover, parsing of redo logs 130 may be accelerated both at master computing node and replica computing node 122.

To process redo logs 130, fragments 280 may be parsed into individual conventional redo records 231 at each node (both master computing node and replica nodes). The nodes may also allocate memory for all parsed conventional redo records 231 and group the conventional redo records 231 by page number. The nodes then apply all the conventional redo records 231 with the same page number to the corresponding page of database 114, 124 in an ordered fashion. Such processing of conventional redo logs 130 puts a lot of pressure on central processing unit (CPU) when parsing the fragments 280, grouping using hash tables, and changing the sequence of the conventional redo records 231. Such processing also requires considerable allocation of memory.

The technology as described herein consolidates multiple conventional redo records into a single consolidated redo record and mitigates the requirements for memory allocation. The consolidated redo logs having consolidated redo records, as described herein, may be parsed faster. Moreover, the technology as described herein may also reduce network traffic.

The new consolidated redo record has data grouped by page number. Therefore, there is no need to group many conventional redo records. There is also no need to put the conventional redo records in an ordered sequence because the order corresponding to receiving time of the redo record is preserved inside the consolidated redo record.

Figure 3:
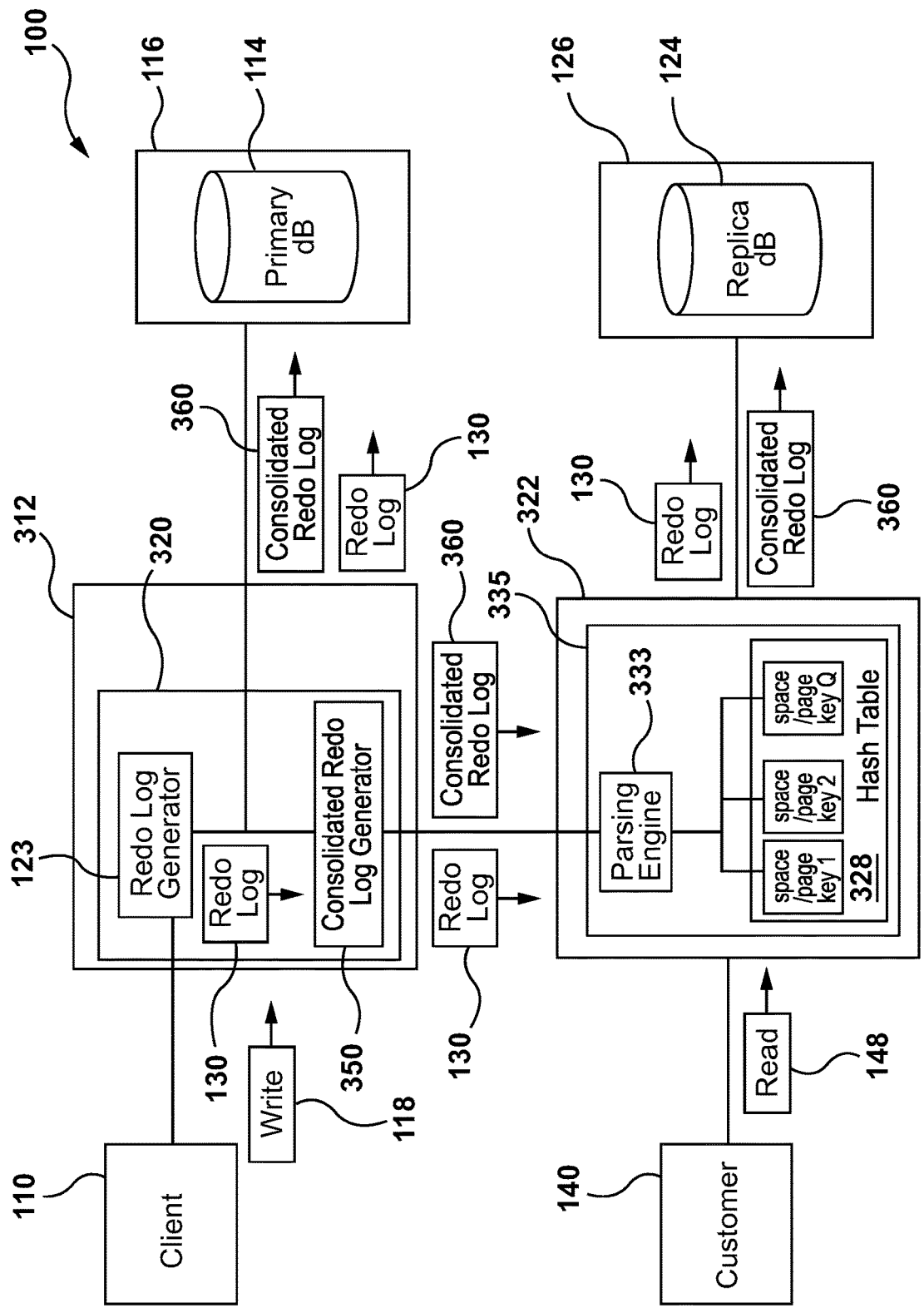
FIG. 3 depicts a schematic diagram of a system which is suitable for implementing non-limiting embodiments of the present technology.

FIG. 3 depicts a schematic diagram of a system 300 which is suitable for implementing non-limiting embodiments of the present technology.

Client 110, customer 140, write operation 118, read operation 148, primary storage node 116 with primary database 114, and replica storage node 126 with replica database 124, depicted in FIG. 3, have been discussed above.

System 300 has a modified master computing node 312 and a modified replica computing node 322. The modified master computing node 312 has a modified master DBMS 320 which communicates with clients, such as client 110, various external applications (not depicted), and primary database 114. In addition to conventional redo log generator 123, discussed above, modified master DBMS 320 also has a consolidated redo log generator 350.

The consolidated redo log generator 350 is configured to generate consolidated redo logs 360. Similar to conventional redo logs 130 in conventional system 100, consolidated redo logs 360 may be used for transmission of data between modified master computing node 312, modified replica computing node 322, and primary and replica storage nodes 116, 126 in system 300. Modified replica computing node 322 has modified parsing engine 333 that is configured to update hash table 328.

Figure 4:
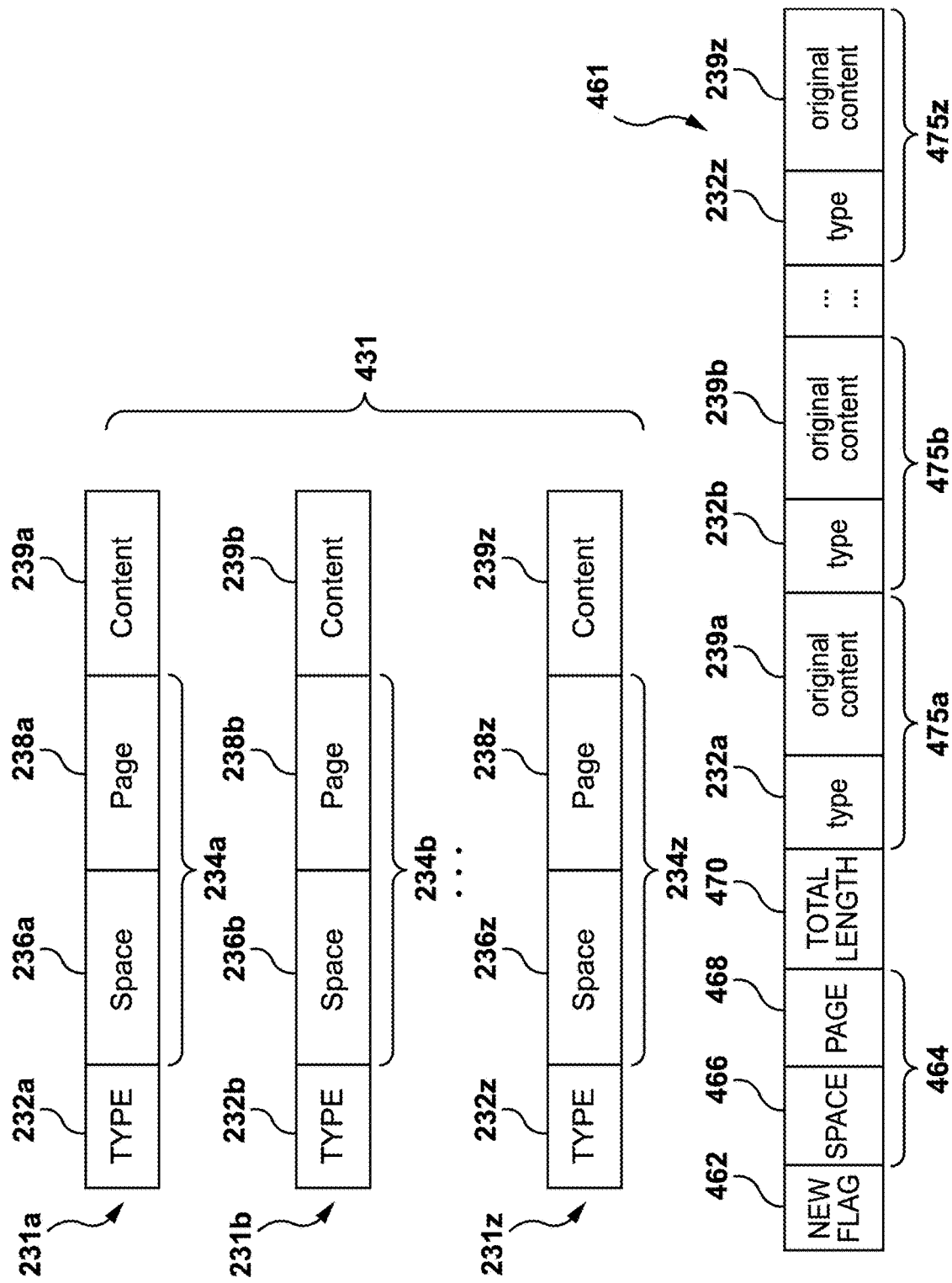
FIG. 4 schematically illustrates selected conventional redo records and a consolidated redo record, in accordance with at least one non-limiting embodiment of the present disclosure.

FIG. 4 schematically illustrates a selection of a subset 431 of conventional redo records 231 with a first conventional redo record 231a, a second conventional redo record 231b, and a last conventional redo record 231z. FIG. 4 also schematically illustrates a consolidated redo record 461, in accordance with at least one embodiment of the present disclosure. The consolidated redo record 461 is generated by consolidated redo log generator 350 from selected ones of the conventional redo records 231a, 231b . . . 231z.

The conventional redo records 231a, 231b . . . 231z of subset 431 have been described above. The conventional redo records 231a, 231b . . . 231z have type indicators 232a, 232b . . . 232z indicating types of the respective redo records 231a, 231b . . . 231z, respective individual data location identifiers 234, a234b . . . 234z, and respective contents 239a, 239b . . . 239z comprising write data and length identifiers embedded therein. The respective individual data location identifiers 234a, 234b . . . 234z comprise space identifiers 236a, 236b . . . 236z and page identifiers 238a, 238b . . . 238z.

Referring also to FIG. 3, consolidated redo log generator 350 receives conventional redo records 231 and determines the subset 431. The conventional redo records 231a, 231b . . . 231z of the subset 431 are selected by consolidated redo log generator 350 when their data location identifiers 234a, 234b . . . 234z are identical. Based on the selected conventional redo records 231a, 231b . . . 231z, consolidated redo log generator 350 generates consolidated redo record 461.

The consolidated redo record 461 comprises a consolidated type indicator 462, a consolidated data location identifier 464, and an overall length value 470. The consolidated type indicator 462 may be a "flag".

The consolidated redo record 461 has a single instance of consolidated data location identifier 464. The consolidated data location identifier 464 is the same as individual data location identifiers 234a, 234b . . . 234z for all selected conventional redo records 231a, 231b . . . 231z. The consolidated redo record 461 may exclude the individual data location identifiers 234a, 234b . . . 234z of selected conventional redo records 231a, 231b . . . 231z.

The overall length value 470 indicates a combined length of the information of selected conventional redo records 231a, 231b . . . 231z combined into consolidated redo record 461. Each time the information of another, newly selected conventional redo record 231, is added to consolidated redo record 461, overall length value 470 is changed to indicate the new length of consolidated redo record 461. In some embodiments, the consolidated redo record 461 excludes individual length identifiers of each selected conventional redo record 231.

In some embodiments, overall length value 470 directly follows consolidated data location identifier 464. This accelerates processing at modified replica computing node 322, because modified parsing engine 333 may read the overall length value 470 right after reading consolidated data location identifier 464. When processing consolidated redo logs 360, the overall length value 470 may be used by the modified parsing engine 333 to calculate where the beginning of a next overall length value 470 can be found in a fragment of consolidated redo log 360. After reading the overall length value 470, modified parsing engine 333 may skip reading the rest of information of consolidated redo record 461 and move on to the next consolidated redo record 461.

The information of the selected conventional redo records 231a, 231b . . . 231z included in the consolidated redo record 461 also comprises segments 475a, 475b . . . 475z corresponding to selected conventional redo records 231a, 231b . . . 231z. In at least one embodiment, each segment 475a, 475b, . . . 475z has a type indicator 232a, 232b . . . 232z and original contents 239a, 239b . . . 239z of the corresponding selected conventional redo record 231a, 231b . . . 231z.

The segments 475a, 475b . . . 475z are grouped because they share the same data location identifier of selected conventional redo records 231a, 231b . . . 231z. The segments 475a, 475b . . . 475z follow each other based on the order of arrival of the corresponding conventional redo records 231a, 231b . . . 231z to consolidated redo log generator 350.

Figure 5:
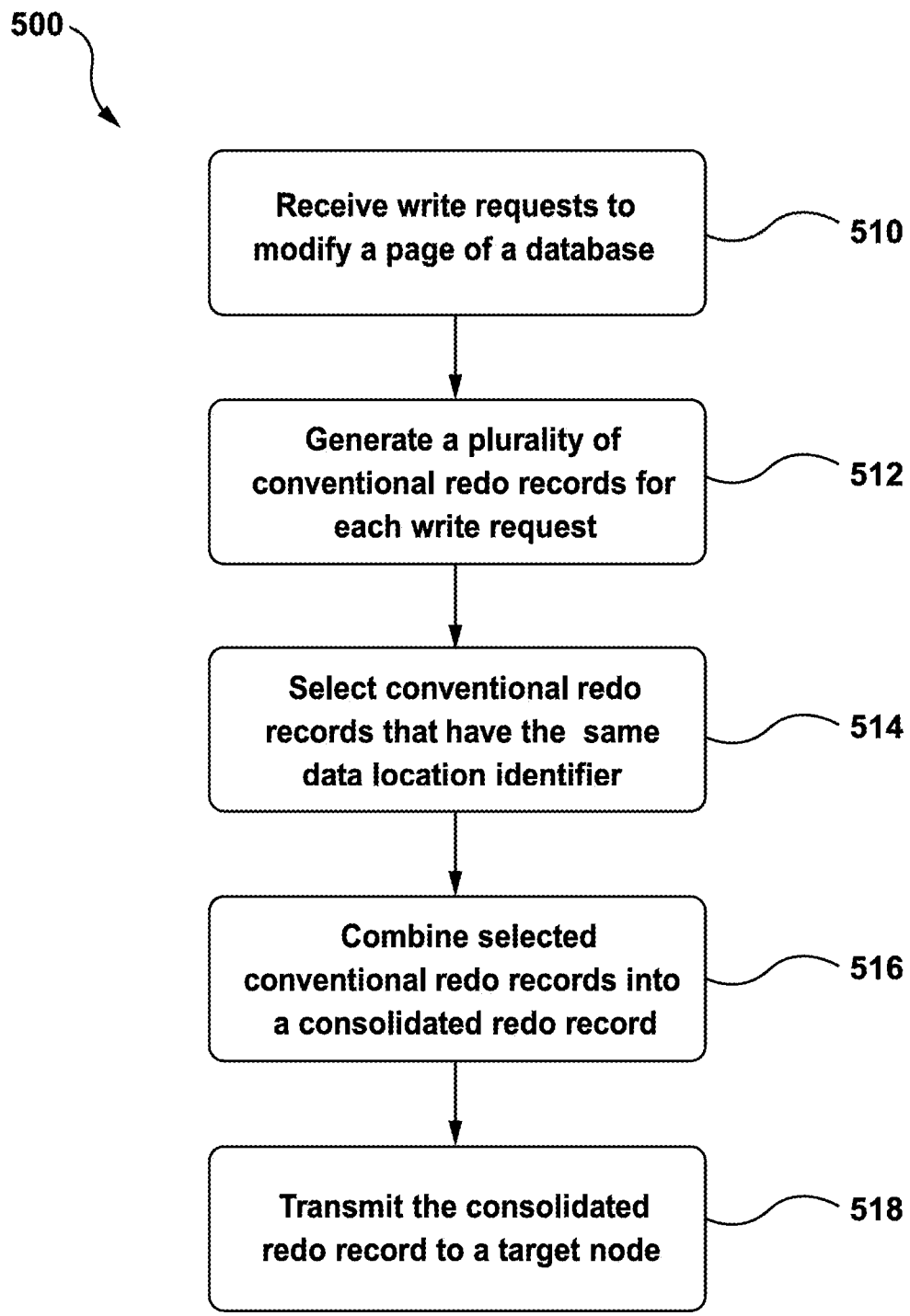
FIG. 5 depicts a flow chart illustrating a method for processing write requests, in accordance with at least one non-limiting embodiment of the present disclosure.

FIG. 5 depicts a flow chart illustrating a method 500 for processing write requests, in accordance with at least one non-limiting embodiment of the present disclosure. When describing method 500, reference is also made to FIGS. 3-4.

At step 510, master computing node 312 receives one or more write requests 118 to modify a page of a database, which has primary database 114 and one or more replica databases 124. As described above, each write request 118 may correspond to one transaction.

At step 512, conventional redo log generator 123 generates a plurality of conventional redo records 231 for each write request 118.

At step 514, consolidated redo log generator 350 selects the received conventional redo records 231 to determine selected conventional redo records 231a, 231b . . . 231z. The selection of conventional redo records 231a, 231b . . . 231z is based on that they have an identical data location identifier 234a, 234b . . . 234z. The selected conventional redo records 231a, 231b . . . 231z may have the same page identifier 238a, 238b . . . 238z. The selected conventional redo records 231a, 231b . . . 231z may also have the same space identifier 236a, 236b . . . 236z. The page identifier 238a, 238b . . . 238z indicates a page within the space indicated by the corresponding space identifier 236a, 236b . . . 236z.

In some embodiments, there may be any number of selected conventional redo records 231a, 231b . . . 231z and any number of corresponding segments 475a, 475b . . . 475z in one consolidated redo record 461.

In other embodiments, consolidated redo log generator 350 may enforce a pre-determined specified threshold number of conventional redo records. In these embodiments, as new write requests are received and new conventional redo records 231a, 231b . . . 231z are generated, the consolidated redo log generator 350 may stop adding conventional redo records 231a, 231b . . . 231z that share the same data location identifier to the consolidated redo record 461 if a number of conventional redo records 231a, 231b . . . 231z combined in the consolidated redo record 461 already meets the specified threshold number of conventional redo records. On the other hand, if the additional conventional redo record comprises the same data location identifier and if the number of conventional redo records 231a, 231b . . . 231z already combined into the consolidated redo record 461 is less than the specified threshold number of redo records combinable into the consolidated redo record 461, the consolidated redo log generator 350 may combine the additional redo record into the consolidated redo record 461.

At step 516, consolidated redo log generator 350 of modified master computing node 312 combines selected conventional redo records 231a, 231b . . . 231z into consolidated redo record 461. At step 518, consolidated redo record 461 is transmitted to a target node, which may be any node where the conventional redo logs are sent. In some embodiments, the target node may be the modified replica computing node 322 at which primary database 114 is replicated.

Figure 6:
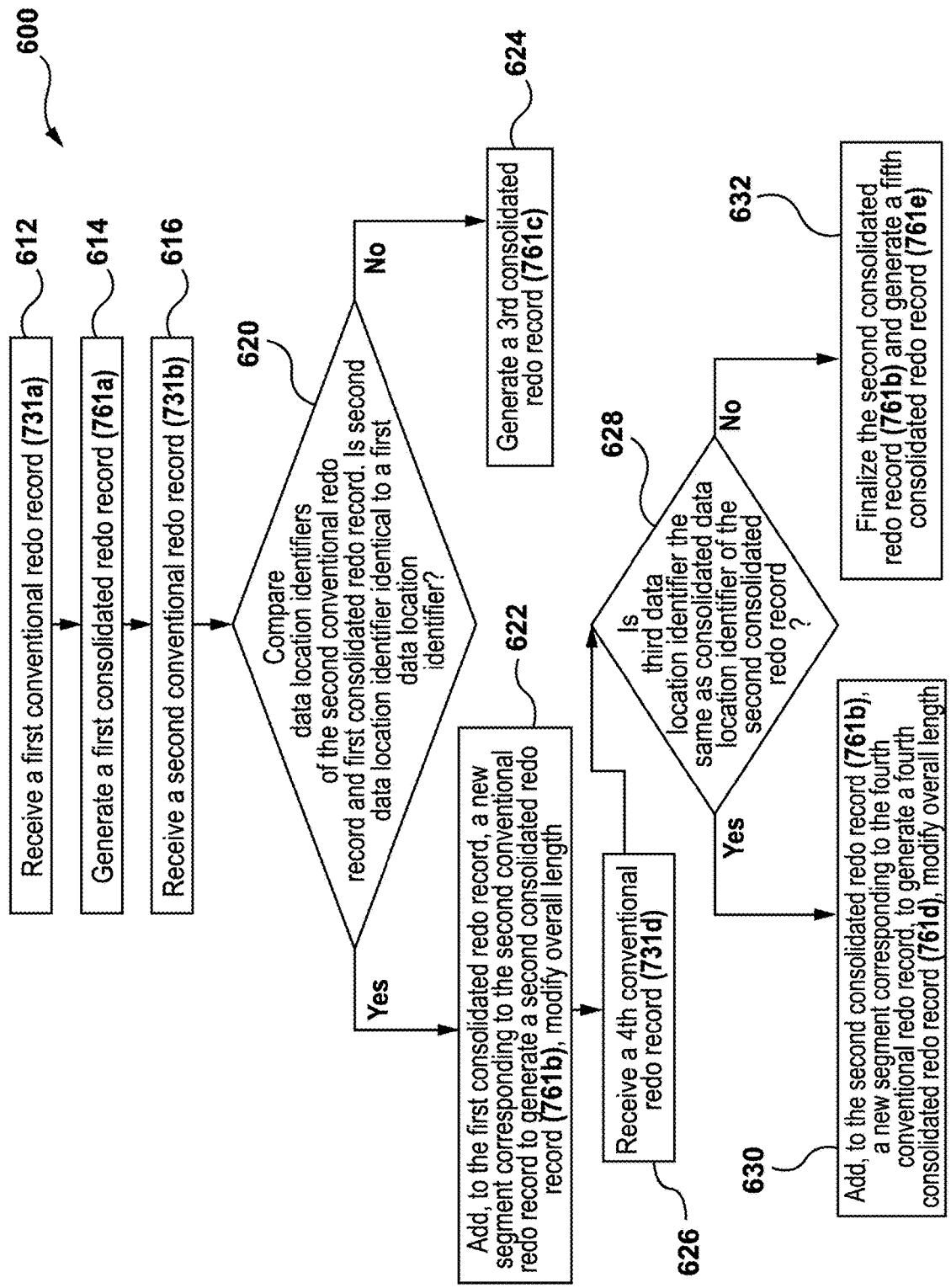
FIG. 6 depicts a flow chart illustrating a method for generating the consolidated redo record of FIG. 4, in accordance with at least one other non-limiting embodiment of the present disclosure.
Figure 7:
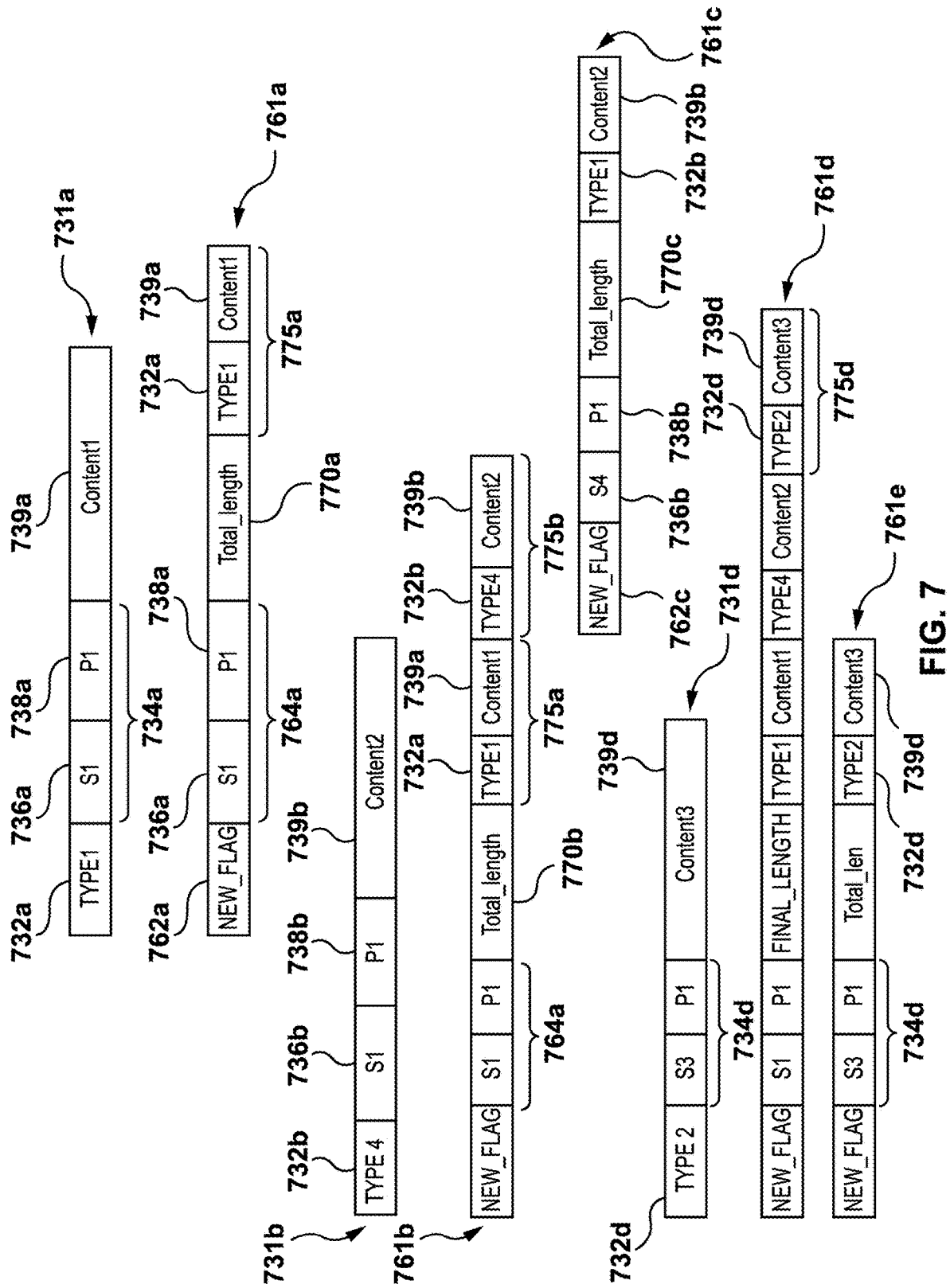
FIG. 7 illustrates non-limiting examples of conventional redo records and consolidated redo logs when implementing the method of FIG. 6.

FIG. 6 depicts a flow chart illustrating a method 600 for generating the consolidated redo record 461, in accordance with at least one other non-limiting embodiment of the present disclosure. FIG. 7 illustrates non-limiting examples of conventional redo records 231 and consolidated redo records 461 when implementing method 600. In some embodiments, method 600 may be implemented in consolidated redo log generator 350 of the modified master DBMS 320. When describing method 600, reference is also made to FIGS. 3-4.

At step 612, consolidated redo log generator 350 receives a first conventional redo record 731a depicted in FIG. 7. At step 614, consolidated redo log generator 350 generates a first consolidated redo record 761a depicted in FIG. 7.

The first consolidated redo record 761a comprises a first consolidated type indicator 762a indicating that this is a consolidated redo record. The first consolidated redo record 761a also comprises a consolidated data location identifier 764a, which is identical to data location identifier 734a, and has first space identifier 736a and first page identifier 738a of first conventional redo record 731a. The first consolidated redo record 761a has a first overall length value 770a which corresponds to individual length value of first conventional redo record 731a. The first consolidated redo record 761a also has a first segment 775a corresponding to first conventional redo record 731a. The first segment 775a has first type indicator 732a and first content 739a of first conventional redo record 731a. In some embodiments, first overall length value 770a indicates the length of first segment 775a.

At step 616 of method 600, consolidated redo log generator 350 receives a second conventional redo record 731b. At step 620, consolidated redo log generator 350 compares consolidated data location identifier 764a of first consolidated redo record 761a and second data location identifier 734b of second conventional redo record 731b.

At step 622, in response to consolidated data location identifier 764a and second data location identifier 734b being identical, consolidated redo log generator 350 modifies first consolidated redo record 761a to obtain (generate) a modified first consolidated redo record, referred to herein as a "second consolidated redo record 761b", by adding a portion of data of second conventional redo record 731b to first consolidated redo record 761a.

The second consolidated redo record 761b is also depicted in FIG. 7. In addition to data of first consolidated redo record 761a, second consolidated redo record 761b comprises a second segment 775b which corresponds to second conventional redo record 731b.

The second segment 775b has the data of second conventional redo record 731b. The second segment 775b may include second type indicator 732b and second content 739b. In addition to amending first consolidated redo record 761a with second segment 775b, consolidated redo log generator 350 replaces the first overall length value 770a by second overall length value 770b. The second overall length value 770b is based on the full length of second consolidated redo record 761b. The second overall length value 770b may indicate a combined length of the information of first and second conventional redo records 731a and 731b, such as a combined length of first and second segments 775a and 775b. The second overall length value 770b is larger than first overall length value 770b because second consolidated redo record 761b is longer than first consolidated redo record 761a.

When step 620 indicates that consolidated data location identifier 764a and second data location identifier 734b are different from each other, consolidated redo log generator 350 generates a third consolidated redo record 761c, depicted in FIG. 7, at step 624. The third consolidated redo record 761c is based on second conventional redo record 731b and thus comprises data related to second conventional redo record 731b. The third consolidated redo record 761c comprises third consolidated type indicator 762c, indicating that this is a consolidated redo record and that it consolidates information about multiple individual redo records. The third consolidated redo record 761c also comprises second space identifier 736b and second page identifier 738b of second conventional redo record 731b. The third consolidated redo record 761c also has a third overall length value 770c which corresponds to individual length value of second conventional redo record 731b. The third consolidated redo record 761b also has second type indicator 732b and second content 739b of second conventional redo record 731b.

In some embodiments, if consolidated data location identifier 764a and second data location identifier 734b are different from each other, consolidated redo record 761a is replaced with conventional redo record 731a in order to revert generation of consolidated redo record 761b. The conventional redo record 731a may then be transmitted to the target node, such as modified replica computing node 322.

Usually, conventional redo logs that are generated and transmitted by conventional redo log generator 123 have series of many conventional redo records 731a that have similar data location identifiers 734a. In other words, quite often one conventional redo record is followed by another conventional redo record with the same data location identifier. Therefore, generating consolidated redo records 761a for each conventional redo record 731a with new data location identifier indicating space and page (<s,p>) helps to speed up generation process of consolidated redo records 761a.

Continuing after step 622 where second consolidated redo record 761b has been generated, at step 626 consolidated redo log generator 350 receives a fourth conventional redo record 731d, depicted in FIG. 7. At step 628, consolidated redo log generator 350 determines whether a fourth data location identifier 734d is similar to consolidated data location identifier 764a of second consolidated redo record 761b.

If fourth data location identifier 734d is similar to consolidated data location identifier 764a, at step 630, a third segment 775d corresponding to fourth conventional redo record 731d is added to second consolidated redo record 761b to obtain a fourth consolidated redo record 761d. The new overall length value 770d corresponds to the new total length of fourth consolidated redo record 761d. The third segment 775d may include a fourth type indicator 732d and a fourth content 739d.

If a fourth data location identifier 734d is not the same as consolidated data location identifier 764a, at step 632, consolidated redo log generator 350 finalizes second consolidated redo record 761b and transmits it to the target node, such as modified replica node 322. The consolidated redo log generator 350 also generates a fifth consolidated redo record 761e based on fourth conventional redo record 731d. In some embodiments, after a conventional redo record with different data location identifier has been received, consolidated redo records 761 may be finalized and then transmitted out of consolidated redo log generator 350 to the target node.

Referring now back to FIG. 3, the finalized consolidated redo record 761d is transmitted to modified replica computing node 322. The finalized consolidated redo record 761d is received by modified parsing engine 333. The modified parsing engine 333 can process both conventional redo records 231 and consolidated redo records 461, 761d by editing hash table 328.

When modified parsing engine 333 applies consolidated redo records 461 to hash table 328, it parses and applies such consolidated redo records 461 as a single identity, which speeds up the processing of write requests.

Using consolidated redo records 461 in system 300 described herein may help to save on memory allocation and to reduce network traffic in system 300. The consolidated redo records 461 are shorter than multiple corresponding conventional redo records 231a . . . 231z bearing the same information. Therefore, less data needs to be recorded or transmitted between nodes of system 300.

Referring to FIG. 2B, when conventional redo log 130 is processed, the conventional parsing engine 133 needs to scan into each conventional redo record 231a, 231b deep enough to determine offset to starting point 291a of the next redo record portion in fragment 280. Contrastingly, in consolidated redo record 461, the overall length value 470 is located close to the beginning of each consolidated redo record 461. Therefore, when processing consolidated redo logs 360 with consolidated redo records 461, the modified parsing engine 233 can skip to the very end of consolidated redo record 461 by parsing the first several bytes of that consolidated redo record 461 and analyzing the overall length value 470. Moreover, the modified parsing engine 333 does not need to put the consolidated redo records or conventional redo records in any specific order because the order of arrival of consolidated redo records and conventional redo records to consolidated redo log generator 350 is preserved inside the consolidated redo log 360.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A computing node comprising:
   a processor; and
   a non-transitory storage medium storing instructions executable by the processor to:
      receive a plurality of write requests to modify one or more pages of a database;
      generate a plurality of redo records including one redo record for each write request of the plurality of write requests, each respective redo record of the plurality of redo records comprising:
         a respective data location identifier, and
         a respective content;
      select a subset of the plurality of redo records, each redo record of the subset comprising an identical data location identifier;
      combine the redo records of the subset into a consolidated redo record, the consolidated redo record comprising:
         a single instance of the identical data location identifier, and
         information of the redo records of the subset, the information including the respective contents of the redo records of the subset and excluding individual data location identifiers of the redo records of the subset; and
      transmit the consolidated redo record to a target node.

2. The computing node of claim 1, wherein the data location identifier comprises a page identifier.

3. The computing node of claim 2, wherein the data location identifier further comprises a space identifier to identify a space, and the page identifier identifies a page within the space.

4. The computing node of claim 1, wherein:
the content of each respective redo record of the plurality of redo records comprises
write data.

5. The computing node of claim 4, wherein the consolidated redo record further comprises an overall length value indicating a combined length of the information of the redo records of the subset combined into the consolidated redo record.

6. The computing node of claim 4, wherein:
each respective redo record of the plurality of redo records comprises a type indicator to indicate a type of the respective redo record, and
the information of the redo records of the subset included in the consolidated redo record comprises the type indicators of the redo records of the subset.

7. The computing node of claim 4, wherein:
each respective redo record of the plurality of redo records comprises an individual length value indicating a length of the content of the respective redo record, and
the information of the redo records of the subset included in the consolidated redo record comprises individual length values of the redo records of the subset.

8. The computing node of claim 1, wherein:
each respective redo record of the plurality of redo records comprises a type indicator indicating a type of the respective redo record, a respective individual data location identifier, an individual length value, the content comprising write data, and
the consolidated redo record contains a single instance of the identical data location identifier, an overall length value indicating a combined length of the information of the redo records of the subset combined into the consolidated redo record, and a plurality of segments, each segment of the plurality of segments comprising (i) the type indicator, (ii) the individual length value, and (iii) the content of a corresponding redo record of the subset.

9. The computing node of claim 1, wherein the instructions are executable on the processor to:
combine a first value of a first redo record of the subset and a second value of a second redo record of the subset into a merged value included in a segment of the consolidated redo record, the first value representing a first write operation on a first offset in a page, the second value representing a second write operation on a second offset in the page, and the merged value representing a combination of the first write operation and of the second write operation.

10. The computing node of claim 1, wherein the instructions are executable on the processor to:
receive an additional write request to modify one or more pages of the database;
generate an additional redo record for the additional write request; and
if the additional redo record comprises the identical data location identifier and if a number of redo records already combined into the consolidated redo record is less than a specified threshold number of redo records combinable into the consolidated redo record, combine the additional redo record into the consolidated redo record.

11. The computing node of claim 1, wherein the computing node is a master computing node to process write requests, and the target node is a replica computing node at which the database is replicated.

12. A method comprising:
receiving, at a computing node, a plurality of write requests to modify one or more pages of a database;
generating, at the computing node, a plurality of redo records including one redo record for each write request of the plurality of write requests, each respective redo record of the plurality of redo records comprising:
a respective data location identifier, and
a respective content;
selecting a subset of the plurality of redo records, each redo record of the subset comprising an identical data location identifier;
combining, at the computing node, the redo records of the subset into a consolidated redo record, the consolidated redo record comprising:
a single instance of the identical data location identifier, and
information of the redo records of the subset, the information including the respective contents of the redo records of the subset and excluding individual data location identifiers of the redo records of the subset; and
transmitting the consolidated redo record from the computing node to a target node.

13. The method of claim 12, wherein the data location identifier comprises a page identifier.

14. The method of claim 13, wherein:
the data location identifier further comprises a space identifier to identify a space, and
the page identifier identifies the page within the space.

15. The method of claim 12, wherein:
the content of each respective redo record of the plurality of redo records comprises
write data.

16. The method of claim 15, wherein the consolidated redo record further includes an overall length value indicating a combined length of the information of the redo records of the subset combined into the consolidated redo record.

17. The method of claim 15, wherein:
each respective redo record of the plurality of redo records comprises a type indicator to indicate a type of the respective redo record, and
the information of the redo records of the subset included in the consolidated redo record comprises type indicators of the redo records of the subset.

18. The method of claim 15, wherein:
each respective redo record of the plurality of redo records comprises an individual length value indicating a length of the content of the respective redo record, and
the information of the redo records of the subset included in the consolidated redo record comprises individual length values of the redo records of the subset.

19. The method of claim 12, wherein:
each respective redo record of the plurality of redo records comprises a type indicator indicating a type of the respective redo record, a respective individual data location identifier, an individual length value, the content comprising write data, and
the consolidated redo record contains a single instance of the identical data location identifier, an overall length value indicating a combined length of the information of the redo records of the subset combined into the consolidated redo record, and a plurality of segments, each segment of the plurality of segments comprising (i) the type indicator, (ii) the individual length value, and (iii) the content of a corresponding redo record of the subset.

20. The method of claim 12, further comprising:
combining a first value of a first redo record of the subset and a second value of a second redo record of the subset into a merged value included in a segment of the consolidated redo record, the first value representing a first write operation on a first offset in a page, the second value representing a second write operation on a second offset in the page, and the merged value representing a combination of the first write operation and of the second write operation.

21. The method of claim 12, further comprising:
receiving an additional write request to modify one or more pages of the database;
generating an additional redo record for the additional write request; and
if the additional redo record comprises the identical data location identifier and if a number of redo records already combined into the consolidated redo record is less than a specified threshold number of redo records combinable into the consolidated redo record, combining the additional redo record into the consolidated redo record.

22. The method of claim 12, wherein the computing node is a master computing node to process write requests, and the target node is a replica node at which the database is replicated.

23. The method of claim 12, wherein combining, at the computing node, the redo records of the subset into the consolidated redo record, comprises:
receiving a first redo record having a first data location identifier;
generating a first consolidated redo record comprising:
the first data location identifier and
a first segment based on the first redo record;
receiving a second redo record having a second data location identifier;
if the first data location identifier is the identical as the second data location identifier:
generating a second consolidated redo record by adding, to the first consolidated redo record, a second segment based on the second redo record and excluding the second data location identifier.

24. The method of claim 23, further comprising:
if the first data location identifier is different from the second data location identifier:
generating a new consolidated redo record comprising:
the second data location identifier and
a new segment based on a third redo record, the new consolidated redo record excluding information of the first redo record.

25. A system for processing a plurality of write requests, the system comprising:
a database;
a computing node adapted to:
receive the plurality of write requests to modify one or more pages of the database,
generate a plurality of redo records including one redo record for each write request of the plurality of write requests, each respective redo record of the plurality of redo records comprising:
a respective data location identifier, and
a respective content,
select a subset of the plurality of redo records, each redo record of the subset comprising an identical data location identifier,
combine the redo records of the subset into a consolidated redo record, the consolidated redo record comprising:
a single instance of the identical data location identifier, and
information of the redo records of the subset, the information including the respective contents of the redo records of the subset and excluding individual data location identifiers of the redo records of the subset, and
transmit the consolidated redo record; and
a target node adapted to receive the consolidated redo record from the computing node.

* * * * *